(12) United States Patent
Beauvais

(10) Patent No.: US 8,167,257 B2
(45) Date of Patent: May 1, 2012

(54) APPARATUS, METHOD, AND SYSTEM FOR SUPPORTING AN OBJECT

(75) Inventor: Vincent Pierre Beauvais, New Westminster (CA)

(73) Assignee: Xantrex Technology Inc., Livermore, CA (US)

( * ) Notice: Subject to any disclaimer, the term of this patent is extended or adjusted under 35 U.S.C. 154(b) by 682 days.

(21) Appl. No.: 11/790,220

(22) Filed: Apr. 24, 2007

(65) Prior Publication Data

US 2008/0265117 A1 Oct. 30, 2008

(51) Int. Cl.
*E04G 25/00* (2006.01)
(52) U.S. Cl. .............. 248/200.1; 248/217.1; 248/220.21
(58) Field of Classification Search .............. 248/222.4, 248/232, 240.1, 247, 312.1, 475.1, 466
See application file for complete search history.

(56) References Cited

U.S. PATENT DOCUMENTS

| 6,384,336 B1 * | 5/2002 | VanderVelde et al. .......... 174/95 |
| 6,766,992 B1 * | 7/2004 | Parker ........................... 248/300 |
| 7,271,335 B2 * | 9/2007 | Dinh .............................. 174/58 |

OTHER PUBLICATIONS

WO/03/039302 A1, Inventor Tomas Andersson, International Publication Date May 15, 2003.*

* cited by examiner

*Primary Examiner* — Amy Sterling
*Assistant Examiner* — Erin W Smith
(74) *Attorney, Agent, or Firm* — Nixon Peabody LLP

(57) ABSTRACT

An apparatus, method, and system for supporting an object or objects. The apparatus includes a first body operably configured to be mounted to a surface. The apparatus also includes a supporting connector on the first body, for supporting the object. The apparatus also includes a stabilizer on the first body generally spaced apart from and generally parallel to the supporting connector, operably configured to cooperate with the object to stabilize the object into a stationary position in cooperation with the supporting connector. The apparatus further includes at least one guide on the first body, the at least one guide on the first body being operably configured to guide an adjacent apparatus into an aligned position beside the apparatus on the surface.

9 Claims, 6 Drawing Sheets

APPARATUS, METHOD, AND SYSTEM FOR SUPPORTING AN OBJECT

BACKGROUND OF THE INVENTION

1. Field of Invention

This invention relates generally to supporting an object, and more particularly to methods, apparatuses, and systems for supporting an object on a surface.

2. Description of Related Art

In many applications, it is often desirable to install an object, such as heavy equipment, on a wall or other surface. For example, in electrical systems, it may be desirable to mount an inverter/charger or a distribution panel on a wall. In some instances, an inverter/charger or a distribution panel may weigh approximately 120 pounds, so it is often impractical to mount these objects directly on a wall. Instead, it may be more practical to fasten a body such as a bracket to the wall, and then support the object on the body.

Many surfaces, such as walls, include structural elements such as studs or joists. Often, these structural elements are spaced apart at regular intervals such as 12 inches, 16 inches, or 24 inches. In order to mount a body for supporting a heavy object to a surface with adequate structural support, it is often necessary to use fasteners that pass through openings in the body and cooperate directly with the structural elements. However, locating these structural elements may be time-consuming because the support structures are often invisible behind a covering such as a sheet of drywall, and may require special equipment such as a stud sensor to locate the structural elements.

Therefore, when mounting an object to a surface, it is often necessary to use special equipment such as a stud sensor to ensure that the fasteners will cooperate directly with the structural elements or the surface. In addition, it is often necessary to use special equipment such as a leveling device to ensure that the object is level. Thus, mounting a series of objects of fixed size to a surface can be very time-consuming and can require extensive use of special equipment such as stud sensors or leveling devices on each object because each object must be independently positioned relative to the support structures, and each object must be independently leveled.

Also, some objects include a structure for support. Supporting a heavy object during mounting may be difficult because much of the object's weight must be supported by means other than the final mounting support until the final mounting support is secure, or until the object is secured to the support. Also, removing the object from the support may be difficult because unfastening the object from the support can cause the object to become immediately unattached unless it is secured by other means, which can create an unsafe situation.

SUMMARY OF THE INVENTION

In accordance with one aspect of the invention, there is provided an apparatus for supporting an object. The apparatus includes a first body operably configured to be mounted to a surface. The apparatus also includes a supporting connector on the first body, for supporting the object. The apparatus also includes a stabilizer on the first body generally spaced apart from and generally parallel to the supporting connector, operably configured to cooperate with the object to stabilize the object into a stationary position in cooperation with the supporting connector. The apparatus further includes at least one guide on the first body, the at least one guide on the first body being operably configured to guide an adjacent apparatus into an aligned position beside the apparatus on the surface.

The supporting connector may include a holder operably configured to hold an object adapter secured to the object.

The holder may include a bite operably configured to contact a surface on the object adapter.

The first body may have a generally flat planar portion adjacent the supporting connector and the supporting connector may include a bent portion of the first body bent at an acute angle relative to the generally flat planar portion, the bite being on the bent portion.

The generally flat planar portion may be adjacent the stabilizer and the stabilizer may include a flange including a generally perpendicular portion extending generally perpendicular to the generally flat portion and an angled portion extending at an acute angle from the generally perpendicular portion.

The flange and the bent portion may be generally spaced apart and parallel to each other.

The first body may have first and second parallel spaced apart edges, and the bent portion and the flange may be disposed along the first and second spaced apart edges.

The stabilizer may include a holder operably configured to hold the object in the stationary position.

The holder may have an edge that defines an opening for receiving a fastener.

The holder may be operably configured to hold a fastener for fastening the object to the stabilizer.

The stabilizer may include a flange projecting from the first body.

The first body may have a generally flat planar portion adjacent the stabilizer and the flange may include a bent portion of the first body including a generally perpendicular portion extending generally perpendicular to the generally flat planar portion and an angled portion extending at an acute angle from the generally perpendicular portion, the holder being on the angled portion.

The first body may have first and second opposite sides and at least one guide may be disposed on at least one of the first and second opposite sides.

The at least one guide may be operably configured to be fastened to the surface.

The at least one guide may include first and second parallel spaced apart guides.

The first and second guides may have respective holders for holding fasteners for fastening the first body to the surface.

The respective holders may be spaced apart by a standard distance.

The first body may include first and second opposite sides and the first and second guides may be on the first and second opposite sides respectively.

The first and second guides may be complementary to each other.

The first guide may include a projection and the second guide may include a receptacle.

The first body may be generally flat planar and the projection and the receptacle may lie generally in the same plane as the first body.

The projection may include an elongated portion which may have first and second parallel spaced apart edges extending outwardly from the first body and a third edge extending generally between the first and second edges and generally at right angles thereto. The receptacle may include fourth and fifth edges extending inwardly of the first body and a sixth edge extending generally between the fourth and fifth edges and generally at right angles thereto.

The third edge and the sixth edge may be generally the same length.

In accordance with another aspect of the invention, there is provided a system for supporting an object. The system includes the apparatus described above and any of it's variations and further includes an adjacent apparatus also for supporting an object. The adjacent apparatus includes a second body operably configured to be mounted to a surface. The adjacent apparatus also includes a second supporting connector on the second body, for supporting the object. The adjacent apparatus also includes a second stabilizer on the second body generally spaced apart and generally parallel to the second supporting connector, operably configured to cooperate with the object to stabilize the object into a stationary position in cooperation with the second supporting connector. The adjacent apparatus further includes at least one guide on the body, the at least one guide on the second body being operably configured to guide another adjacent apparatus into an aligned position beside the adjacent apparatus on the surface.

The at least one guide on the first body may include a projection.

The at least one guide on the second body may include a receptacle having a shape complementary to the projection.

The first body may be generally flat planar and the projection may lay generally in the same plane as the first body and the second body is generally flat planar and the receptacle may lay generally in the same plane as the second body.

The projection may include an elongated portion which may have first and second parallel spaced apart edges extending outwardly from the first body and a third edge extending generally between the first and second edges and generally at right angles thereto. The receptacle may include fourth and fifth edges extending inwardly of the second body and a sixth edge extending generally between the fourth and fifth edges and generally at right angles thereto.

The first, second, fourth and fifth edges may have generally the same length and the third edge and the sixth edge may have generally the same length such that the first and fourth edges are operable to contact each other while the second and fifth edges contact each other while the third and sixth edges contact each other to align the second body relative to the first body.

The at least one guide on the first body and at least one guide on the second body may have respective receptacles for receiving fasteners for fastening the first and second bodies to the surface.

In accordance with another aspect of the invention, there is provided a method for securing an object support apparatus to a surface. The method involves fastening a first body of a first object support apparatus to the surface. The method also involves receiving a projection of a guide on the first body in a receptacle of a guide on a second body of a second support apparatus such that first and second parallel spaced apart edges on the projection contact corresponding fourth and fifth edges of the receptacle on the second body while a third edge on the projection, extending between the first and second edges, contacts a sixth edge of the second body, the sixth edge extending between the fourth and fifth edges, to align object supporting connectors and object stabilizing connectors on the first and second bodies to cause the object support connectors to be collinear with each other and to cause the object stabilizing connectors to be collinear with each other.

The method may involve defining a standard distance with openings on the first body and fastening may comprise inserting fasteners through the openings such that the fasteners will cooperate with support structures associated with the surface and which are spaced apart by the standard distance.

The method may involve supporting the object with at least a portion of the object support connectors and stabilizing the object with at least a portion of the object stabilizing connectors.

Supporting the object may involve receiving an object adapter secured to the object, in a bite formed in the at least a portion of the object support connectors.

Stabilizing the object may involve fastening at least a portion of a flange on the object to at least a portion of a flange on at least one of the first and second bodies.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
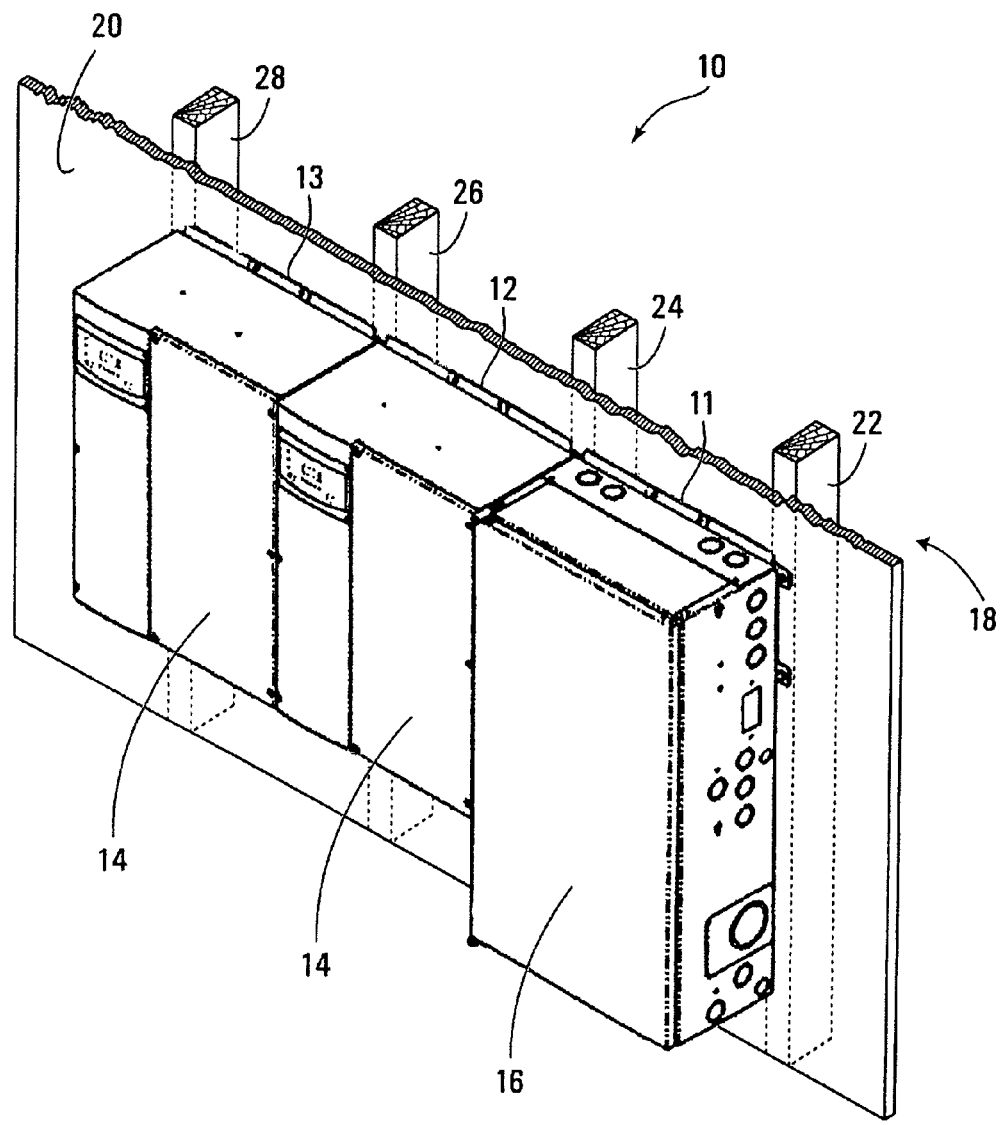
FIG. 1 is a perspective view of a system according to a first embodiment of the invention.

Referring to FIG. 1, a system for securing an object to a surface such as a wall, according to a first embodiment of the invention, is shown generally at 10. In this embodiment, the system 10 includes a first apparatus 11, a second apparatus 12, and a third apparatus 13 for supporting an object or plurality of objects. Other embodiments may include more or less apparatuses. The first apparatus 11 is exemplary of the apparatuses 11, 12, and 13, and a reference herein to "the apparatus 11" is a reference to any one of the apparatuses 11, 12, and 13. The apparatus 11 is illustrated in greater detail in FIGS. 2 and 3.

Still referring to FIG. 1, in this embodiment each apparatus 11 supports an object such as an inverter/charger 14 or a distribution panel 16, although other objects may alternatively be supported. Also, although a plurality of apparatuses 11 and objects 14 are shown in FIG. 1 in a one-to-one correspondence, it will be appreciated that an apparatus may support any number of objects, and an object may be supported by any number of apparatuses.

The apparatuses 11, 12, and 13 are mounted on a wall 18. The wall 18 preferably includes a generally flat covering 20, which may include drywall panels, for example. The covering 20 is preferably mounted in a vertical orientation, to a plurality of generally parallel upstanding spaced apart support structures including a first support structure 22, a second support structure 24, a third support structure 26, and a fourth support structure 28. The support structures may be conventional dimensional lumber such as 2×4's, for example. The covering 20 has a flat outer surface 21 to which the apparatuses 11, 12, and 13 are mounted.

Figure 2:
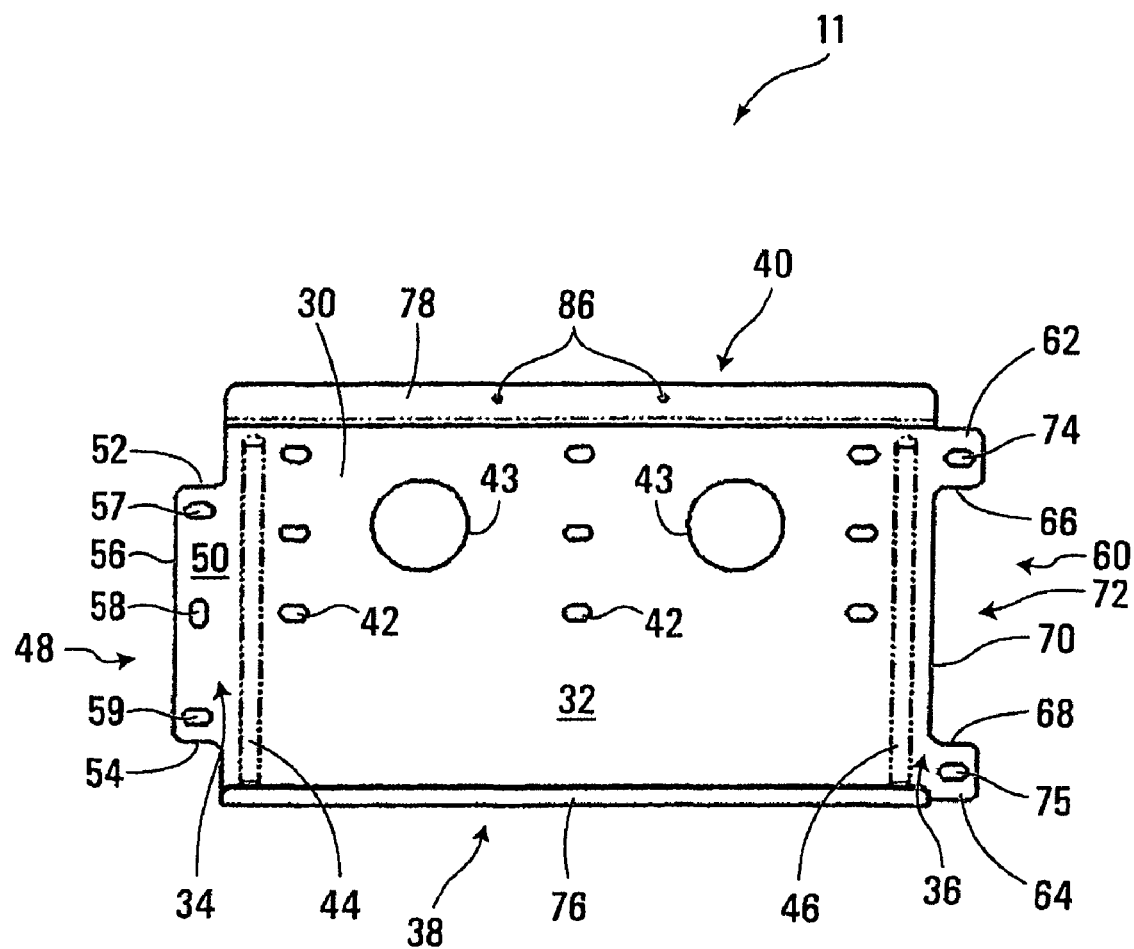
FIG. 2 is a front elevational view of a body according to the embodiment shown in FIG. 1.

Referring to FIG. 2, an apparatus according to the first embodiment of the invention is shown generally at 11. The apparatus 11 includes a body 30, which is formed from a plate of 14-gauge (1.9 mm thick) cold-rolled steel, which is powder-coated for appearance and corrosion resistance. The body 30 includes a generally flat planar portion 32, a first side 34, a second side 36 opposite the first side, a bottom portion 38, and a top portion 40. The body 30 further includes a first reinforcing rib 44 on the first side 34, and a second reinforcing rib 46 on the second side 36. The generally flat planar portion 32 preferably defines a plurality of openings 42 for receiving fasteners (not shown), and openings 43 that provide access for electrical connections to equipment when such equipment is mounted to the body 30.

Figure 4:
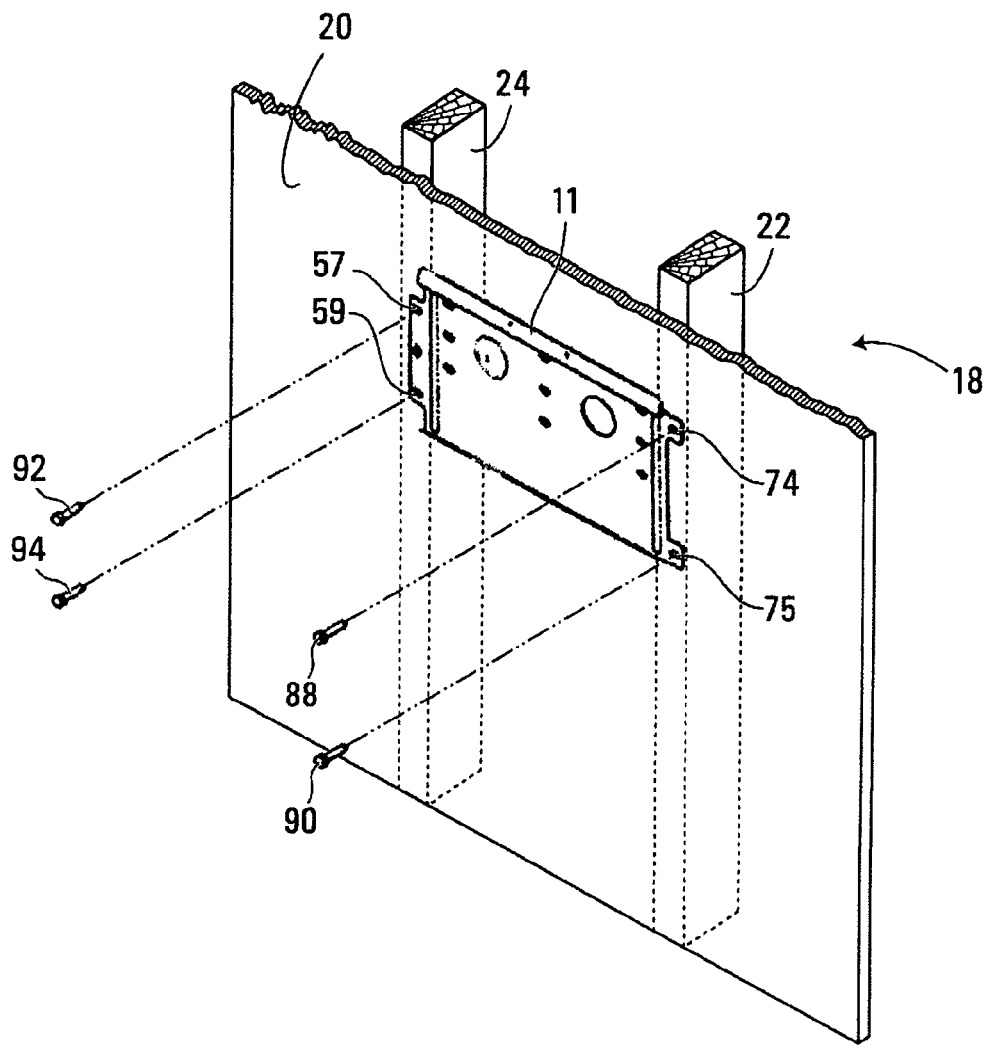
FIG. 4 is a perspective view of the body of FIG. 2 illustrating fasteners in exploded view for fastening the body to support structures.

The body 30 further includes a first guide 48 on the first side 34. The first guide 48 is generally co-planar with the generally flat portion 32, and includes a generally rectangular projection 50 having first and second edges 52 and 54 extending outwardly from the generally flat portion 32, and a third edge 56 extending between the first and second edges. The first guide 48 also has openings 57, 58, and 59, which act as holders for holding fasteners, as shown in FIG. 4. Although three openings 57, 58, and 59 are shown in FIG. 2, any number of openings may be included on the first guide 48.

The body 30 further includes a second guide 60 on the second side 36. The second guide 60 is generally co-planar with the generally flat portion 32, and includes a second projection 62 and a third projection 64 spaced apart from each other. The second and third projections 62 and 64 include fourth and fifth parallel and spaced apart edges 66 and 68 respectively, extending inwardly to the generally flat portion 32. The second guide 60 further includes a sixth edge 70 extending between the fourth and fifth edges 66 and 68. The edges 66, 68, and 70 define a generally rectangular receptacle 72. The second and third projections 62 and 64 also have openings 74 and 75 respectively, which act as holders for holding fasteners, as shown in FIG. 4. Although two openings 74 and 75 are shown in FIG. 2, any number of openings may be included in the second guide 60.

Figure 6:
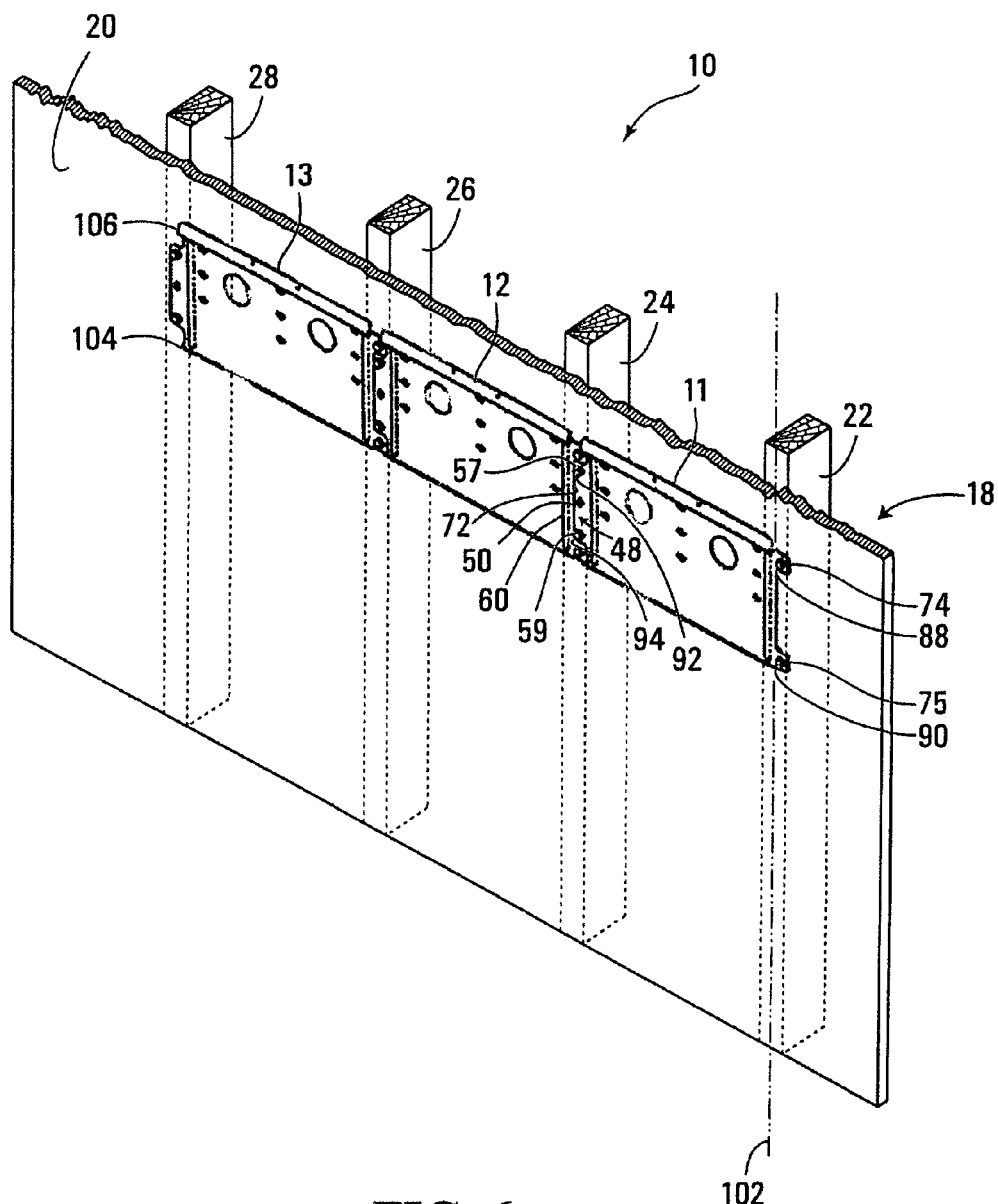
FIG. 6 is a perspective view of the system of FIG. 1 shown without equipment mounted to respective bodies.

The receptacle 72 has a shape complementary to the projection 50. Thus, the first, second, fourth, and fifth edges 52, 54, 66, and 68 have generally the same length, and the third and sixth edges 56 and 70 have generally the same length. Thus, when two bodies 30 of the same type are juxtaposed, as shown in FIG. 6, the first edge 52, second edge 54, and third edge 56 of the first body contact the fourth edge 66, fifth edge 68, and sixth edge 70 respectively of the second body.

In other embodiments, other shapes of the first and second guides 48 and 60 are possible. For example, the first and second edges 52 and 54 need not be parallel, but may be at acute or oblique angles to the third edge 56. Also, the edges 52, 54, and 56 may be curved. In these embodiments, the second guide 60 would be shaped so that the receptacle 72 has a shape complementary to the projection 50.

In still other embodiments, the first guide 48 and the second guide 60 may not be complementary, provided that they cooperate to define a preferred orientation of a body 30 relative to another body. For example, the first and second edges 52 and 54 may be longer or shorter than the fourth and fifth edges 66 and 68, or the third edge 56 may include one or more portions that do not contact the sixth edge 70. Also, the first and second guides 48 and 60 need not be co-planar with the generally flat portion 32, although this is desirable.

Still referring to FIG. 2, the body 30 further includes a supporting connector 76 on the bottom portion 38, adjacent the generally flat portion 32. The body 30 also includes a stabilizer 78 on the top portion 40, also adjacent the generally flat portion 32, and generally spaced apart from and generally parallel to the supporting connector 76.

Figure 3:
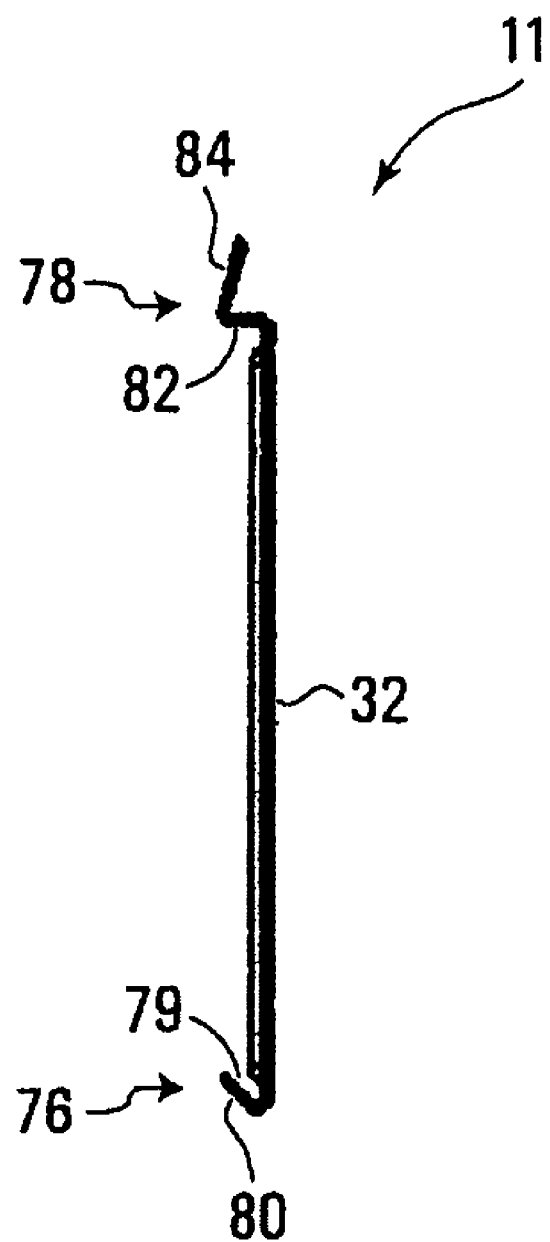
FIG. 3 is a side elevational view of the body of FIG. 2.
Figure 5:
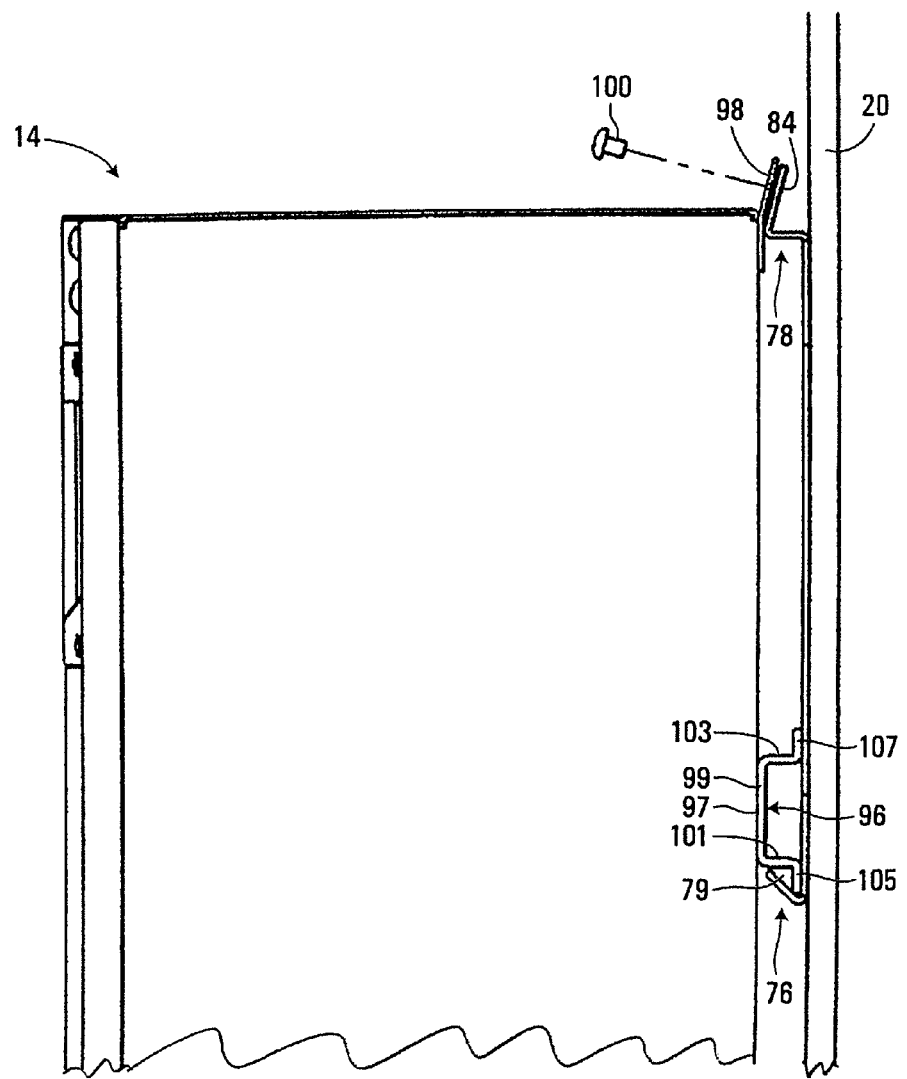
FIG. 5 is a side elevational view of an object supported by the body of FIG. 2.

Referring to FIG. 3, the supporting connector 76 includes a holder, which includes a bite 79 defined by a bent portion 80 bent at an acute angle to the generally flat portion 32. The stabilizer 78 includes a flange, which includes a generally perpendicular portion 82 that is adjacent and generally perpendicular to the generally flat portion 32, and an angled portion 84 that is adjacent and at an acute angle to the generally perpendicular portion. The angled portion 84 acts as a holder for holding an object mounted to the apparatus in place. Referring to FIG. 2, the angled portion 84 has openings 86 for receiving fasteners as shown in FIG. 5, for fastening the object 14 to the body 30. Although two openings 86 are shown in FIG. 2, any number of openings 86 may be included.

Referring to FIG. 4, the apparatus 11 is fastened to the flat surface of the covering 20. Fasteners 88, 90, 92, 94, extend through respective openings 74, 75, 57, 59 in the body 30 to structurally mount the apparatus to structures 22 and 24. The fasteners 88, 90, 92, and 94 may include nails, screws, or bolts, for example.

The support structures 22 and 24 are generally parallel and spaced apart by a standard distance such as 16 inches, and the openings 57 and 59 are spaced apart from the openings 74 and 75 by the same standard distance. Thus, if the fasteners 88 and 90 pass through a center line of the first support structure 22, then the fasteners 92 and 94 will generally pass through a center line of the second support structure 24 when inserted through the openings 57 and 59 respectively.

Referring to FIG. 5, an object 14 is supported by the apparatus 11. To facilitate mounting the object 14 to the apparatus 11, an object adapter 96 is first secured to the object 14 to cooperate with at least a portion of the supporting connector 76 in order to support at least a portion of the weight of the object on the apparatus 11. To achieve this, the object adapter 96 includes a formed channel 97 of cold-rolled steel which, in this embodiment, is welded to the chassis of the object 14. The channel 97 includes a body 99 having parallel spaced apart legs 101 and 103 having feet 105 and 107 respectively. The feet 105 and 107 are generally co-planar and have surfaces 109 and 110 that contact the flat surface of the covering 20. The foot 105 is dimensioned to fit in the bite 79 of the supporting connector 76.

The object 14 also includes a flange 98 positioned on the object to contact the angled portion 84 of the stabilizer 78 when the object adapter 96 is engaged with the supporting connector 76 as shown. In this embodiment, the flange 98 includes a metal tab that extends a distance as long as the angled portion 84. The flange 98 is made of cold-rolled steel and has openings (not shown) that align with the openings 86 (FIG. 2) in the angled portion 84. Fifth fasteners 100 may be inserted through the openings of the flange 98 and the angled portion 84 to fasten at least a portion of the flange 98 to at least a portion of the angled portion 84. The fifth fasteners 100 may include nuts and bolts, for example.

Operation

The operation of the apparatus is described with reference to FIG. 6. A center line 102 of the first support structure 22 is first located with a device such as a stud sensor, and a mark is made on the covering 20. Then, the first apparatus 11 is positioned on the covering 20 such that the opening 74 is aligned with the center line 102. When the first apparatus 11 is in this position, the first fastener 88 is inserted through the opening 74, and into the covering 20, and the first support structure 22.

The first apparatus 11 is then pivoted in a vertical plane about the first fastener 88 until the first apparatus is level, according to a carpenter's level. Then, the second fastener 90 is inserted through the opening 75, and into the covering 20, and into the first support structure 22. The third and fourth fasteners 92 and 94 are then inserted through the openings 57 and 59 and are secured through the covering 20, and into the second support structure 24. Because the openings 57 and 59 are spaced apart from the openings 74 and 75 by the same standard distance that separates the support structures 22 and 24, and because the first fastener 88 was aligned with the center line 102 of the first support structure 22, the fasteners in the openings 57 and 59 will generally be aligned with a center line (not shown), of the second support structure 24.

Once the first apparatus 11 is in the position described above and as shown in FIG. 6, the second apparatus 12 may be positioned by aligning the second guide 60 (FIG. 2) of the second apparatus with the first guide 48 (FIG. 2) of the first apparatus 11 by causing the first projection 50 on the first apparatus 11 to be received in the receptacle 72 on the second apparatus 12. Because the first apparatus 11 has been aligned as explained above, aligning the second apparatus 12 is quickly and efficiently achieved by simply causing the projection of the first apparatus to be engaged with the receptacle on the second apparatus. Thus, the second apparatus will be level, and the openings 74 and 75 of the second apparatus will be generally aligned with a center line of the second support structure 24, and the openings 57 and 59 of the second apparatus will be generally aligned with a center line of the third support structure 26.

Then, the third apparatus 13 may be positioned by receiving the projection of the second apparatus in the receptacle on the third apparatus. Additional apparatuses can be positioned in the same way. Thus, in the embodiment shown, the first, second, an third apparatuses are quickly and efficiently positioned generally level, and such that openings for receiving fasteners for securing the apparatuses to the wall are aligned with the non-visible conventionally spaced support structures behind the covering 20.

Although the example of FIG. 6 includes only three apparatuses 11, 12, and 13, it will be appreciated that any number of apparatuses may be fastened to the wall 18 in the manner illustrated herein. By installing a plurality of the apparatuses 11 in this manner, the user may advantageously fasten apparatuses 11 to the wall 18 without having to position each body independently, thus saving time and reducing the need for special equipment to install successive apparatuses. When a plurality of apparatuses 11 are aligned in this way, the supporting connectors 76 of the apparatuses will be generally collinear, and thus form a virtually continuous supporting connector 104, and the stabilizers 78 of the apparatuses 11 will be generally collinear, and thus form a virtually continuous stabilizer 106.

Referring back to FIG. 5, in order to support a object 14 on an apparatus 11, a user first supports at least a portion of the weight of the object on the apparatus by engaging the object adapter 96 with the supporting connector 76 by positioning the object such that the foot 105 is received in the bite 79. Next, the user rotates the object 14 about the supporting connector in order to cause the flange 98 to contact the angled portion 84. The fifth fasteners 100 are then inserted in the openings on the flange 98 and the angled portion 84 to fasten the flange to the angled portion. Thus, the supporting connector 76 and the stabilizer 78 cooperate to support the object 14 in a stationary position. The fifth fasteners 100 lock the object in place, preventing accidental dislodgement of the object from the apparatus 11 rendering the object less susceptible to earthquake damage or damage due to accidental removal or vandalism.

Advantageously, at least a portion of the weight of the object 14 is supported by the supporting connector 76 while the user fastens the flange 98 to the angled portion 84. Thus, other means of supporting the weight of the object, such as clamps, may not be required while the object 14 is being mounted to the apparatus 11. Furthermore, when the user removes the object 14 from the apparatus 11, the user can remove the fifth fasteners 100 while at least a portion of the weight of the object is supported by the supporting connector 76, advantageously reducing the need for other means of supporting the weight of the object (such as clamps) while the object is being removed.

As illustrated in FIG. 1, the virtually continuous supporting connector 104 and the virtually continuous stabilizer 106 may be used to support a combination of objects such as inverter/chargers 14 and/or distribution panels 16.

While specific embodiments of the invention have been described and illustrated, such embodiments should be considered illustrative of the invention only and not as limiting the invention as construed in accordance with the accompanying claims.

What is claimed is:

1. An apparatus for supporting an object, the apparatus comprising:
    a first body operably configured to be mounted to a surface and having first and second opposite sides;
    a supporting connector on said first body, for supporting the object, said first body having a generally flat planar portion adjacent said supporting connector and parallel to said surface when said first body is mounted to said surface,
    said supporting connector including a holder having a bite defined by a bent portion bent at an acute angle to said generally flat planar portion, said bite dimensioned to receive therein a surface of an object adapter secured to said object, said bent portion being angled toward said generally flat planar portion,
    wherein said surface of said object adapter is parallel with said generally flat planar portion when said first body is mounted to said surface;
    a stabilizer on said first body generally spaced apart from and generally parallel to said supporting connector, operably configured to cooperate with the object to stabilize the object into a stationary position in cooperation with said supporting connector; and
    first and second spaced apart guides on said first and second opposite sides of said first body and operably configured to guide an adjacent second body into an aligned position beside said first body on said surface, said first and second guides being complementary to each other, said first and second guides each including an opening for mounting said first body directly to said generally flat planar surface,
    wherein said stabilizer includes a flange having a generally perpendicular portion adjacent and generally perpendicular to the generally flat planar portion and an angled portion adjacent to and at an acute angle to the generally perpendicular portion,
    said angled portion including an opening for receiving a fastener for fastening said object to said first body, said angled portion extending away from a top edge of said generally flat planar portion.

2. The apparatus of claim 1 wherein said first body has first and second parallel spaced apart edges, and wherein said bent portion and said flange are disposed along said first and second spaced apart edges.

3. An apparatus for supporting an object, the apparatus comprising:
- a first body having a generally flat planar portion and operably configured to be mounted to a surface and having first and second opposite sides;
- a supporting connector on said first body, for supporting the object, said supporting connector including a holder having a bite defined by a bent portion at an acute angle to said generally flat planar portion, said bite dimensioned to receive therein a surface of an object adapter of said object, said surface of said object adapter being parallel with said generally flat planar portion when said first body is mounted to said surface;
- a stabilizer on said first body generally spaced apart from and generally parallel to said supporting connector, operably configured to cooperate with the object to stabilize the object into a stationary position in cooperation with said supporting connector, wherein said stabilizer and said supporting connector are spaced apart on opposite ends of said generally flat planar portion of said first body; and
- first and second spaced apart guides on said first and second opposite sides of said first body and operably configured to guide an adjacent second body into an aligned position beside said first body on said surface, said first and second guides being complementary to each other,
- wherein said first guide includes a projection having an opening configured to receive a fastener to mount said first guide directly to said surface, and wherein said second guide includes a receptacle having an opening configured to receive a fastener to mount said second guide directly to said surface,
- wherein said first body is generally flat planar and wherein said projection and said receptacle lie generally in the same plane as said first body, and
- wherein said projection comprises an elongate portion having first and second parallel spaced apart edges extending outwardly from said first body and a third edge extending generally between said first and second edges and generally at right angles thereto and wherein said receptacle comprises fourth and fifth edges extending inwardly of said first body and a sixth edge extending generally between said fourth and fifth edges and generally at right angles thereto, and
- wherein said stabilizer includes a flange having an angled portion angled at an acute angle to and extending away from a top edge of said flat planar portion.

4. The apparatus of claim 3 wherein said third edge and said sixth edge are generally the same length.

5. A system for supporting an object, the system comprising a first body having a generally flat planar portion and operably configured to be mounted to a surface;
- a supporting connector on said first body, for supporting the object, said supporting connector including a holder having a bite defined by a bent portion bent at an acute angle to said generally flat planar portion, said bite being configured to receive therein a surface of an object adapter of said object, said surface being parallel with said generally flat planar portion when said first body is mounted to said surface;
- a stabilizer on said first body spaced apart from said supporting connector on opposite ends of said generally flat planar portion, said stabilizer including a flange having an angled portion angled at an acute angle and extending away from a top edge of said flat planar portion; and
- at least one guide on said first body, said at least one guide on said first body including an opening configured to receive therethrough a fastener for mounting said at least one guide directly to said generally flat planar surface;

an adjacent apparatus also for supporting an object, the adjacent apparatus comprising:
- a second body having a second generally flat planar portion and operably configured to be mounted to a second surface;
- a second supporting connector on said second body, for supporting the object said second supporting connector including a second holder having a second bite defined by a second bent portion bent at an acute angle to said second generally flat planar portion, said second bite being configured to receive therein said surface of said object adapter;
- a second stabilizer on said second body spaced apart from said second supporting connector on opposite ends of said second generally flat planar portion, said second stabilizer including a second flange having an angled portion angled at an acute angle and extending away from a second top edge of said second flat planar portion; and
- a second guide on said second body, said second guide including an opening configured to receive therethrough a fastener for mounting said second guide directly to said second surface,
- wherein said at least one guide on said first body comprises a projection, and
- wherein said second guide comprises a receptacle having a shape complementary to said projection.

6. The system of claim 5 wherein said first body is generally flat planar and wherein said projection lies generally in the same plane as said first body and wherein said second body is generally flat planar and wherein said receptacle lies generally in the same plane as said second body.

7. The system of claim 6 wherein said projection comprises an elongate portion having first and second parallel spaced apart edges extending outwardly from said first body and a third edge extending generally between said first and second edges and generally at right angles thereto and wherein said receptacle comprises fourth and fifth edges extending inwardly of said second body and a sixth edge extending generally between said fourth and fifth edges and generally at right angles thereto.

8. The system of claim 7 wherein said first, second, fourth and fifth edges have generally the same length and wherein said third edge and said sixth edge have generally the same length such that said first and fourth edges are operable to contact each other while said second and fifth edges contact each other while said third and sixth edges contact each other to align said second body relative to said first body.

9. A system for supporting an object, the system comprising:
- an object adapter secured to said object, said object adapter including a foot having a surface; and
- a first body configured to be mounted to a surface and having first and second opposite sides, said first body including:
  - a supporting connector for supporting the object, said first body having a generally flat planar portion adjacent said supporting connector and parallel to said surface when said first body is mounted thereto,
  - said supporting connector including a holder having a bite defined by a bent portion bent at an acute angle to said generally flat planar portion, said bite configured to receive therein said surface of said foot such that said surface of said foot is generally parallel to said generally flat planar portion when said first body is mounted thereto, said bent portion angled toward said generally flat planar portion, a stabilizer generally spaced apart from and generally parallel to said supporting connector, operably configured to cooperate with the object to stabilize the object into a stationary position in cooperation with said supporting connector; and first and second spaced apart guides on said first and second opposite sides of said first body and each including an opening for mounting said first body directly to said surface, wherein said stabilizer includes a flange having an angled portion at an acute angle to the generally flat planar portion, said angled portion including an opening for receiving therethrough a fastener for fastening said object to said first body, said angled portion extending away from a top edge of said generally flat planar portion.

* * * * *